US009227569B2

(12) United States Patent
Giorgis et al.

(10) Patent No.: US 9,227,569 B2
(45) Date of Patent: Jan. 5, 2016

(54) LOADING SHELF FOR A VEHICLE LUGGAGE COMPARTMENT

(71) Applicant: FIAT GROUP AUTOMOBILES S.P.A., Torino (IT)

(72) Inventors: Alberto Giorgis, Torino (IT); Armando Spagnolini, Torino (IT); Simone Rosetta, Torino (IT); Caterina Cavagliato, Torino (IT); Carlo Franco Torres, Torino (IT)

(73) Assignee: FIAT Group Automobiles S.p.A., Torino (IT)

( * ) Notice: Subject to any disclaimer, the term of this patent is extended or adjusted under 35 U.S.C. 154(b) by 0 days.

(21) Appl. No.: 14/487,627

(22) Filed: Sep. 16, 2014

(65) Prior Publication Data
US 2015/0001875 A1 Jan. 1, 2015

Related U.S. Application Data (62) Division of application No. 13/303,582, filed on Nov. 23, 2011, now abandoned.

(30) Foreign Application Priority Data

Nov. 24, 2010 (EP) ..................................... 10425362

(51) Int. Cl.
*B60R 5/04* (2006.01)
*B60N 2/36* (2006.01)

(52) U.S. Cl.
CPC . *B60R 5/045* (2013.01); *B60N 2/36* (2013.01); *B60N 2002/363* (2013.01)

(58) Field of Classification Search
CPC ............ B60R 5/04; B60R 5/044; B60R 5/045
USPC ............. 296/24.33, 24.43, 24.44, 37.8, 37.16
See application file for complete search history.

(56) References Cited

U.S. PATENT DOCUMENTS

| 2,934,248 | A | * | 4/1960 | Lown ............................ 224/542 |
| 4,198,091 | A | * | 4/1980 | Appleton ........................ 296/63 |
| 4,620,489 | A | | 11/1986 | Albano |
| 5,037,154 | A | | 8/1991 | Senba et al. |
| 5,213,401 | A | | 5/1993 | Hatcher |
| 5,257,846 | A | * | 11/1993 | Kanai et al. ................ 296/37.14 |
| 5,306,077 | A | | 4/1994 | Trevaskis |
| 5,803,523 | A | | 9/1998 | Clark et al. |
| 5,970,884 | A | * | 10/1999 | Taille et al. ..................... 108/44 |
| 6,189,429 | B1 | | 2/2001 | Liu |

(Continued)

FOREIGN PATENT DOCUMENTS

EP 2 075 153 A 7/2009

*Primary Examiner* — Gregory Blankenship
(74) *Attorney, Agent, or Firm* — Frommer Lawrence & Haug LLP (57) ABSTRACT

A loading shelf for a luggage compartment of a vehicle has one rear panel and at least one front panel coupled by means of a guide-and-slide device, which has two longitudinal channels, fixed relative to the rear panel, and two front slides and two rear slides, which are carried by the front panel and engage the channels; the rear slides are coaxial along an axis orthogonal to the longitudinal direction in which the front panel may slide; channels have respective openings having position, shape and size so as to let the front slides coming out of the channels; when the front slides are outside of the channels, the front panel is rotatable about the axis of the rear slides.

13 Claims, 6 Drawing Sheets

(56) References Cited

U.S. PATENT DOCUMENTS

| | | |
|---|---|---|
| 6,394,001 B1 | 5/2002 | Giesey et al. |
| 6,546,598 B1 | 4/2003 | Nakanou et al. |
| 6,547,298 B2 | 4/2003 | Sotiroff et al. |
| 6,702,355 B1 * | 3/2004 | Price et al. ................. 296/37.16 |
| 7,140,703 B1 | 11/2006 | Holdgate et al. |
| 7,513,552 B2 | 4/2009 | Carvalho |
| 8,256,819 B1 | 9/2012 | Gregory |
| 8,403,438 B2 | 3/2013 | Park et al. |
| 8,517,445 B1 * | 8/2013 | Gregory .................... 296/37.16 |
| 2005/0248171 A1 * | 11/2005 | Guillez et al. ............. 296/24.44 |
| 2006/0016840 A1 * | 1/2006 | Svenson et al. ............ 224/42.32 |
| 2007/0013201 A1 * | 1/2007 | Wagner et al. ............. 296/24.43 |
| 2011/0133508 A1 * | 6/2011 | Zuelch ........................ 296/65.16 |
| 2012/0132601 A1 * | 5/2012 | Giorgis et al. ............. 211/86.01 |
| 2013/0147226 A1 * | 6/2013 | Cao et al. ................... 296/37.16 |
| 2013/0270858 A1 * | 10/2013 | Gaudig et al. ............. 296/184.1 |
| 2014/0054917 A1 * | 2/2014 | Tosco et al. ................ 296/24.44 |
| 2014/0265411 A1 * | 9/2014 | Thota et al. ................ 296/37.16 |
| 2014/0265418 A1 * | 9/2014 | Thota et al. ................ 296/65.16 |
| 2014/0354001 A1 * | 12/2014 | Hanley ....................... 296/24.44 |
| 2015/0145273 A1 * | 5/2015 | Gaas .......................... 296/37.16 |

* cited by examiner

LOADING SHELF FOR A VEHICLE LUGGAGE COMPARTMENT

This application is a division of U.S. patent application Ser. No. 13/303,582 filed Nov. 23, 2011, which claimed priority benefits to European Patent Application Number 10425362.0 filed Nov. 24, 2010, the entire disclosures of all are herein incorporated by reference.

The present invention relates to a loading shelf for a vehicle luggage compartment.

BACKGROUND OF THE INVENTION

Vehicles are known in which the luggage compartment is provided with a horizontal loading shelf, which may be moved height-wise between a lowered position adjacent to a bottom surface of the luggage compartment and a raised position for splitting the luggage compartment into an upper space and a lower space.

In order to be held fixed in the raised position, the loading shelf usually has side fastening members, which are coupled to the side panels of the luggage compartment in a releasable manner. Specifically, such fastening members are either fastened to retaining devices or resting on supporting brackets.

From patent EP2075153, a loading shelf is known having a main board and two front plates which are coupled to respective portions of a twin back seat. The portions of the back seat along with the respective plates are movable parallel to the longitudinal advance direction of the vehicle. In this manner, when the loading shelf is in teh raised position, the plates may cover the gap which has been formed between the back seat and the main board.

The need is felt to improve the above-described solution so as to be able to rest the plates on the backrests of the back seat when such backrests are folded forward on their respective seats, so as to form a single loading surface defined by the backrests and the loading shelf.

SUMMARY OF THE INVENTION

It is the object of the present invention to provide a loading shelf for a vehicle luggage compartment, which allows to meet the need set forth above in a simple and cost-effective manner and which is preferably easy to be moved and/or configured and not much bulky.

According to the present invention, a loading shelf for a vehicle luggage compartment is provided, as defined in claim 1.

BRIEF DESCRIPTION OF THE DRAWINGS

For a better understanding of the present invention, a preferred embodiment is now described, purely by way of example and not of limitation, with reference to the accompanying drawings, in which.

DETAILED DESCRIPTION OF THE INVENTION

Figure 1:
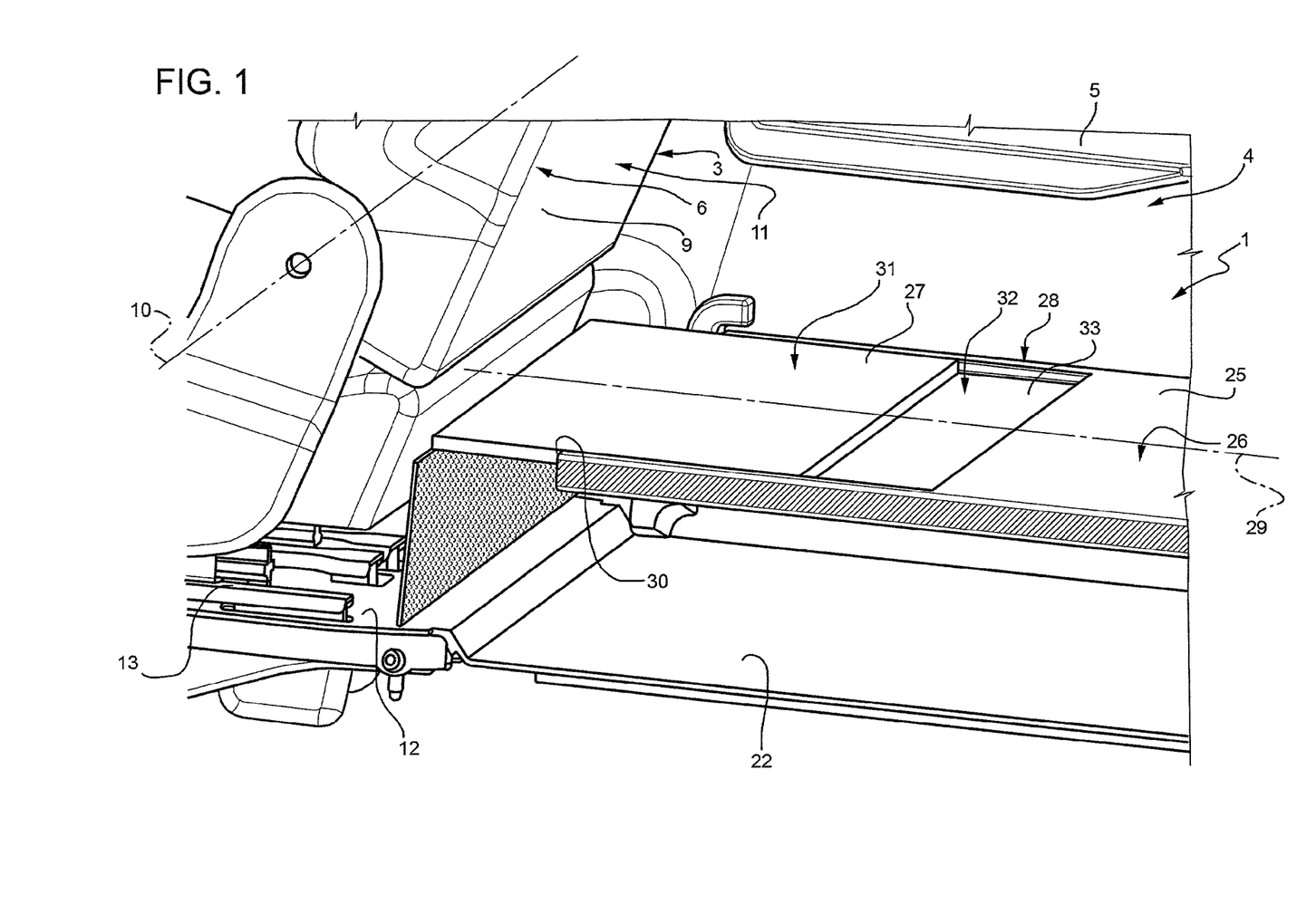
FIG. 1 is a perspective view, with parts removed for clarity, showing a preferred embodiment of the raisable loading shelf for a vehicle luggage compartment according to the present invention.
Figure 2:
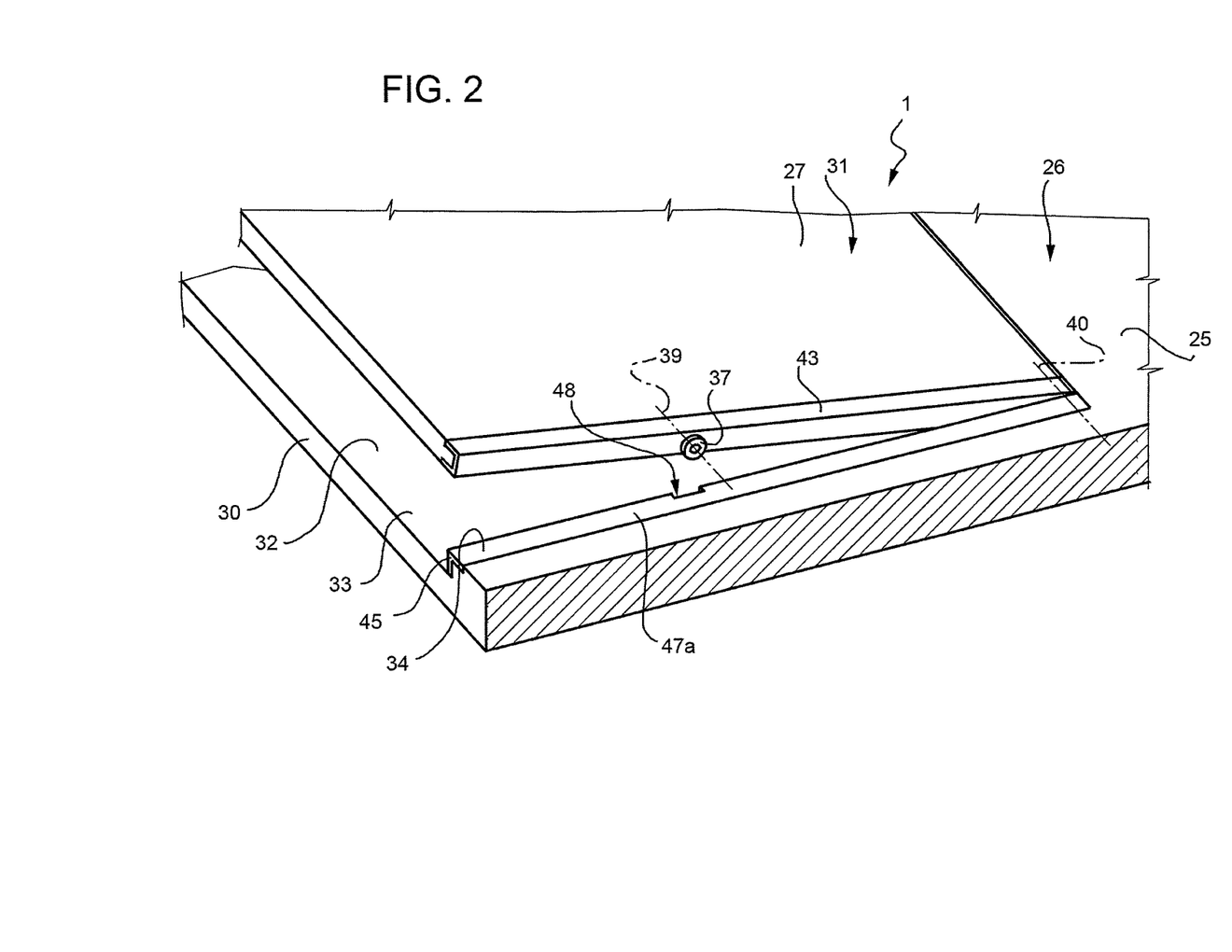
FIGS. 2 and 3 are perspective views showing, on a magnified scale, details of the loading shelf in FIG. 1.

In FIG. 1, 1 indicates, as a whole, a loading shelf (partially shown) for a luggage compartment 4 of a vehicle 5 (partially shown). Vehicle 5 comprises a back seat 3 (partially shown) which frontally defines luggage compartment 4, and it is of a twin type, i.e. comprises two reciprocally adjacent seats 6. Back seat 3 may define either a third row of seats or a second row of seats. Preferably, seats 6 have reciprocally different widths. For the sake of simplicity, FIG. 1 partially shows only one of the two seats 6.

Figure 4:
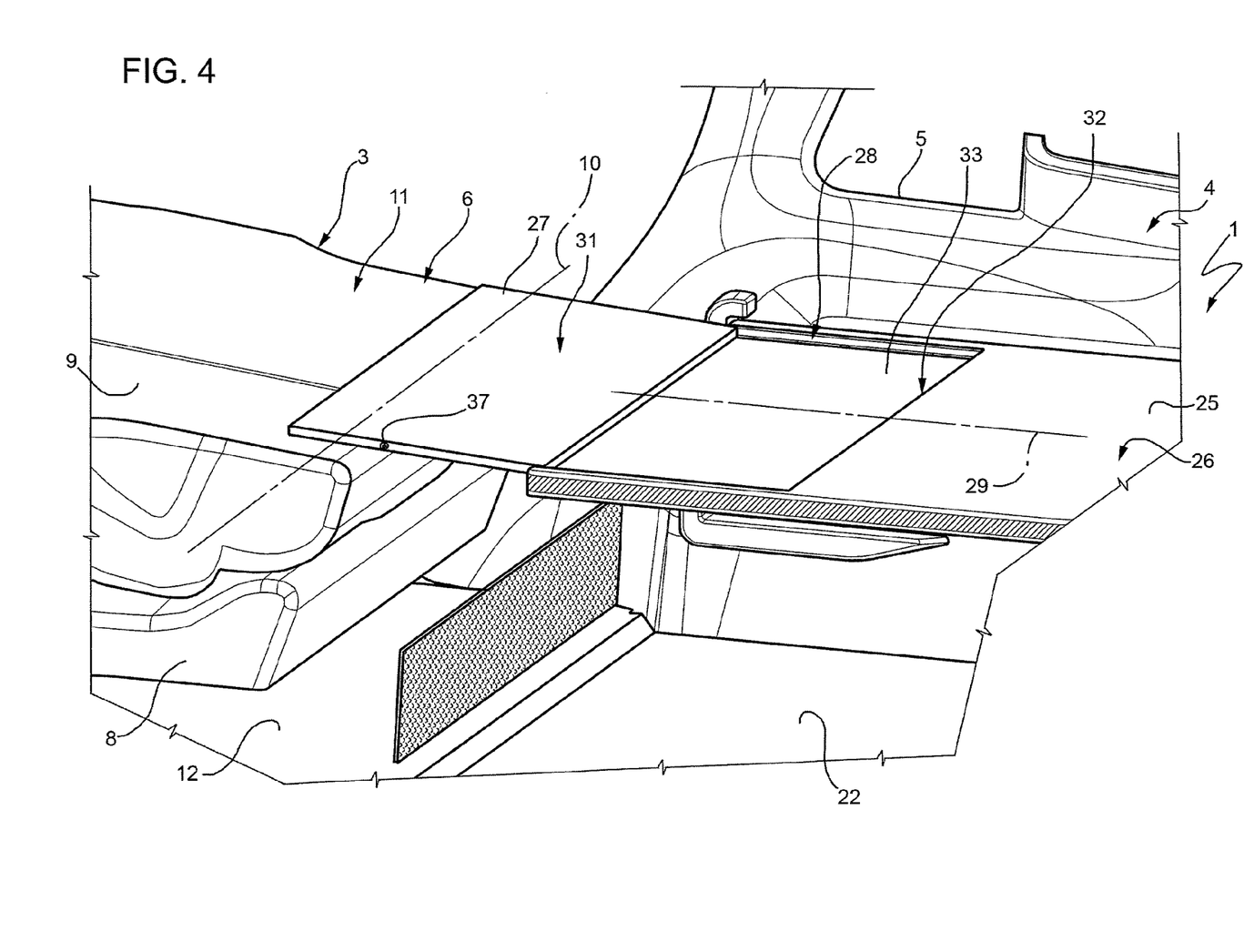
FIG. 4 is similar to FIG. 1 and shows the loading shelf in a different configuration.

Seat 6 comprises a seat 8 and a backrest 9, which is rotatable relative to seat 8 about a horizontal axis 10 orthogonal to the longitudinal advance direction of vehicle 5, both for performing an adjustment of the tilt of backrest 9 for ergonomic purposes, and for being able to fold backrest 9 forward, as shown in FIG. 4, and therefore for being able to add the passenger compartment back zone to luggage compartment 4. Backrest 9 has a rear surface 11, which is substantially flat and facing upward when backrest 9 is folded.

Back seat 3 is coupled to a vehicle floor 12 of vehicle 5 by means of a handling device 13, which allows seats 6 to longitudinally translate relative to vehicle floor 12. This translation defines an adjustment which expands or reduces the longitudinal size of luggage compartment 4, while leaving the number of seats for passengers in the passenger compartment unchanged. Preferably, seats 6 are reciprocally and longitudinally movable in an independent manner. For example, handling device 13 comprises two longitudinal guides for each seat 6, as shown in FIGS. 1 and 4, or an articulated quadrilateral (not shown).

Loading shelf 1 may be manually moved vertically into luggage compartment 4 between a plurality of pre-defined levels, in each of which loading shelf 1 is substantially horizontal and fixed relative to the body of vehicle 5. Specifically, at the lowermost level, loading shelf 1 is resting on a floor 22 of luggage compartment 4, whereby defining the bottom of luggage compartment 4 itself. At the other levels, loading shelf 1 is raised relative to floor 22, so as to split luggage compartment 4 into an upper compartment and a lower compartment, and is resting on supporting members 23 (FIGS. 4 and 5) which are fixed relative to the body and/or floor 22. Specifically, supporting members 23 are defined by brackets built on lining walls of the side panels of luggage compartment 4.

Loading shelf 1 comprises a rear panel 25 (partially shown), which is upperly defined by a substantially flat surface 26, has a width equal to the distance between the side panels of the luggage compartment 4, is coupled (not shown) to such side panels in a fixed yet releasable position, and is made of a cell-like material. Loading shelf 1 further comprises two front panels 27, which are also made of a cell-like material and arranged in adjoining positions, have the same length, and have widths substantially equal to those of backrests 9 of seats 6. For the sake of simplicity, the figures and the following description refer to only one of such panels 27 and to only one seat 6.

Panel 27 is coupled to panel 25 by means of a guide-and-slide device 28, so as to slide along a longitudinal direction 29, parallel to surface 26, and being able to cover the gap between seat 6 and front edge 30 of panel 25. In addition, the length of loading shelf 1 may be varied depending on the longitudinal position of seat 6.

Panel 27 is upperly defined by a substantially flat surface 31 and is at least partially housed into panel 25, specifically into a seat 32 lowerly defined by a wall 33 parallel to direction 29 and surface 26.

Figure 5:
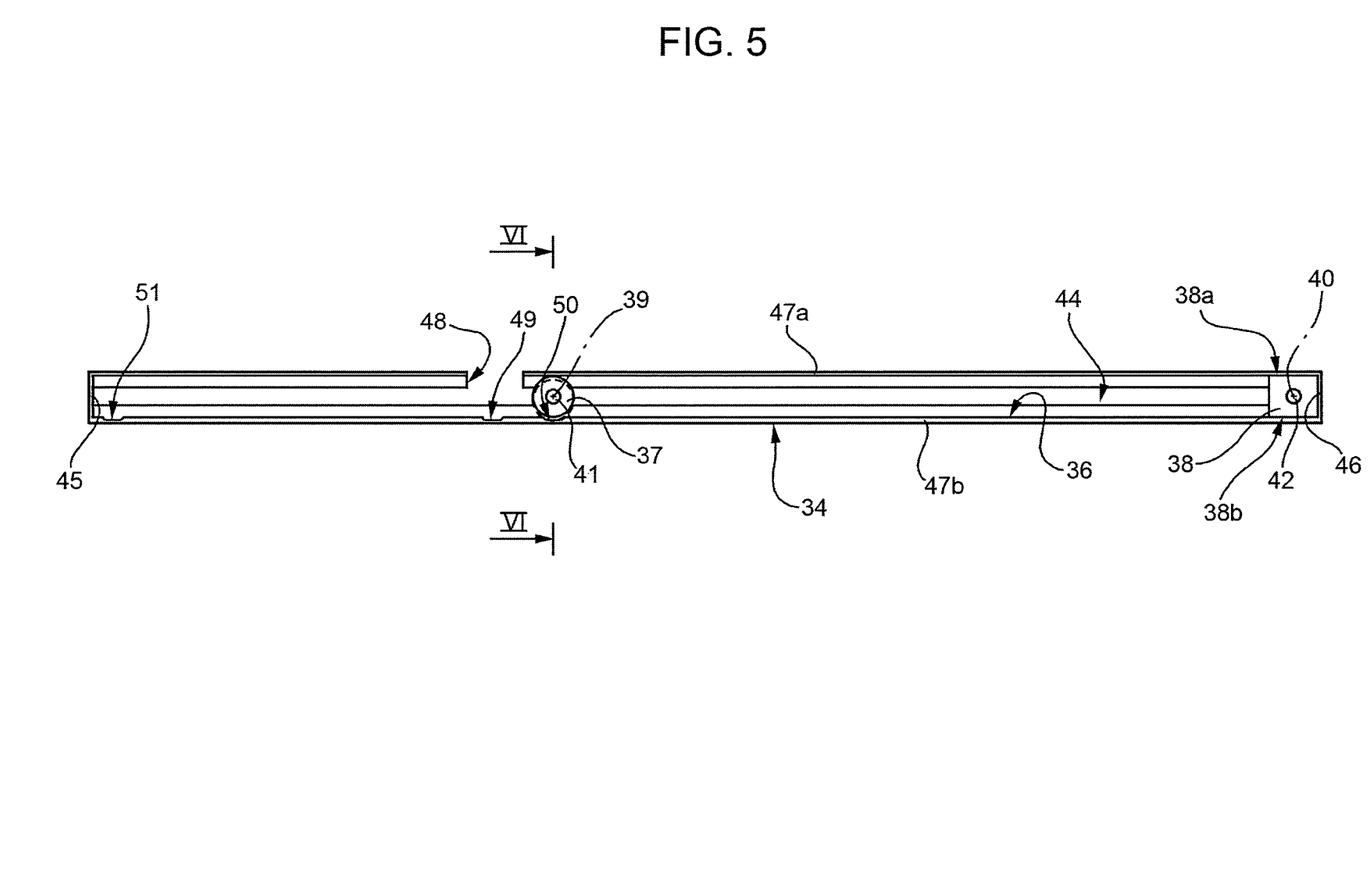
FIG. 5 schematically shows a guide of the loading shelf in FIG. 1.
Figure 6:
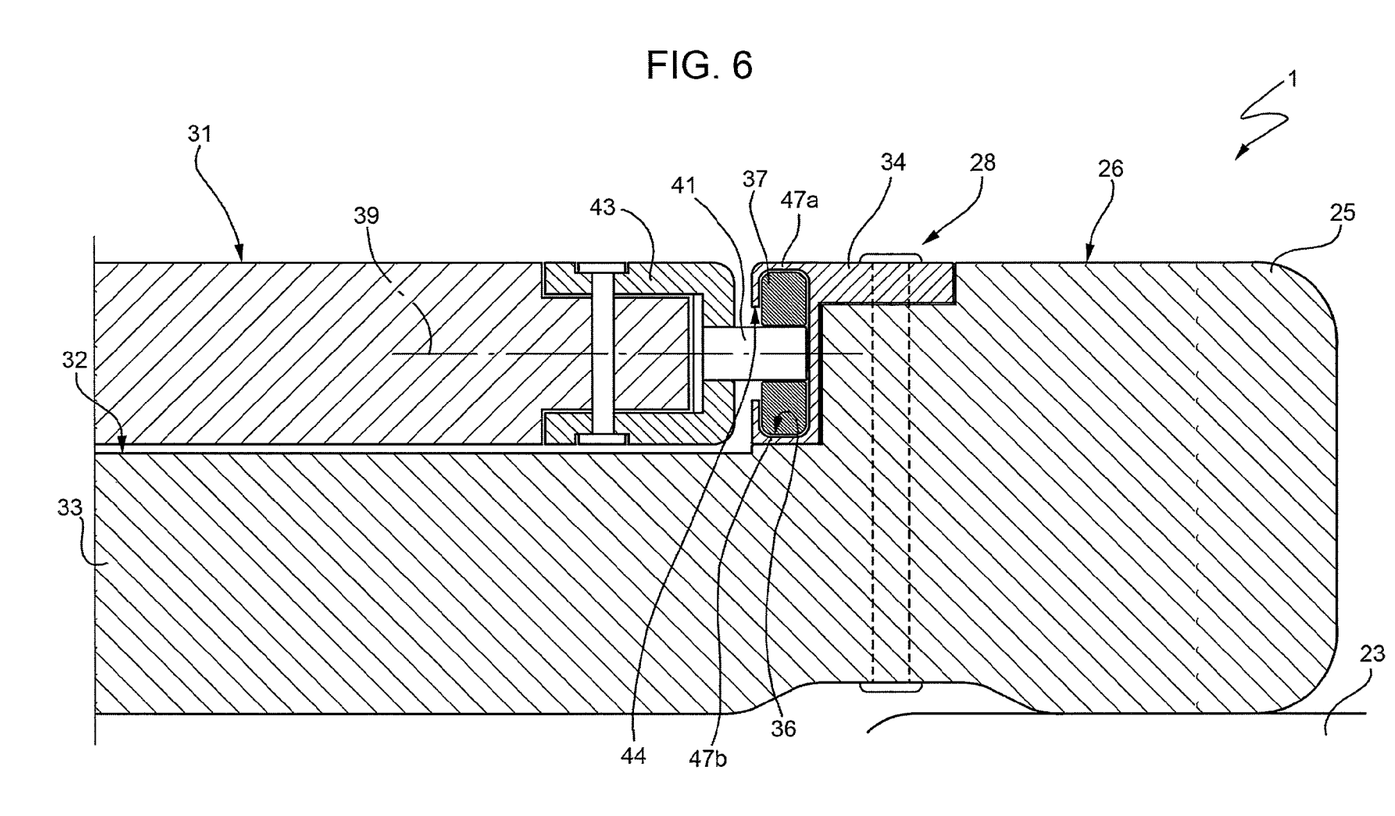
FIG. 6 shows, on a magnified scale, the loading shelf of FIG. 1 with parts removed for clarity, and according to the section plane VI-VI of FIG. 5.

Referring to FIGS. 5 and 6, device 28 comprises two additional rails 34, which define the longitudinal sides of seat 32, are made of a metal material, and are fastened to panel 27. Rails 34 have respective channels 36, each of which longitudinally guides a respective front slide 37 and a respective rear slide 38. Slides 37 are coaxial along an axis 39, and slides 38 are coaxial along an axis 40 parallel to axis 39. Specifically, slides 37 are defined by respective bearings or rollers, while slides 38 are upperly and lowerly defined by flat surfaces 38a reciprocally parallel and slidingly coupled to respective longitudinal walls 47a, 47b of rails 34.

Slides 37,38 are coupled to respective axial pins 41, 42 which are in turn connected to two frames 43, which are made of a metal material and are arranged in fixed positions along the side edges of panel 27. Slides 37,38 are idly turnable about their respective axes 39, 40 relative to panel 27.

Channels 36 have respective longitudinal slots 44, which are facing seat 31 and are crossed by pins 41,42. At their front and rear ends, channels 36 are closed by respective stop surfaces 45,46. When slides 38 are arranged in abutment against surfaces 46, panel 27 is arranged in a rear stop position and is fully housed into seat 32. When slides 37 are arranged in abutment against surfaces 45, panel 27 is arranged in a first front end position and forwardly protrudes relative to edge 30.

Walls 47a are upperly flush with surface 26 and have respective through openings 48. Openings 48 longitudinally have a distance from surface 46 slightly greater than the wheel base between slides 37,38. Openings 48 have a shape and size so as to make slides 37 coming out if panel 27 is rotated upward about axis 40, when loading shelf 1 is in a reference position in which slides 37 are below openings 48. In such a reference position, slides 38 are at a distance of about 12 mm from surfaces 46, which define the bottom of channels 36. In this manner, when panel 27 is arranged in the rear end position, slides 37 do not come out of rails 34 in an unexpected and unwanted manner, such as if there were bumps.

In order to place loading shelf 1 in the reference position in a precise manner, in the rear end position and in the front end position, respective recesses 49,50,51 are provided into channels 36 on walls 47b (FIG. 5) for positioning the rollers defining slides 37. Recesses 49,50,51 have a concave profile complementary to the outer profile of the rollers, so as to hold them in a substantially fixed longitudinal position until a given longitudinal force acts on panel 27.

When slides 37 are made coming out of channels 36, panel 27 has an extra degree of freedom, since it is still able to translate longitudinally, slides 38 being guided by rails 34, but it may also rotate about axis 40. In other words, when slides 37 are arranged below openings 48 or when they are out of rails 34, pins 42 perform the additional function of hinging pins, for rotating panel 27. Instead, when slides 37 engage channels 36, surface 31 is flush with surface 26.

Figure 3:
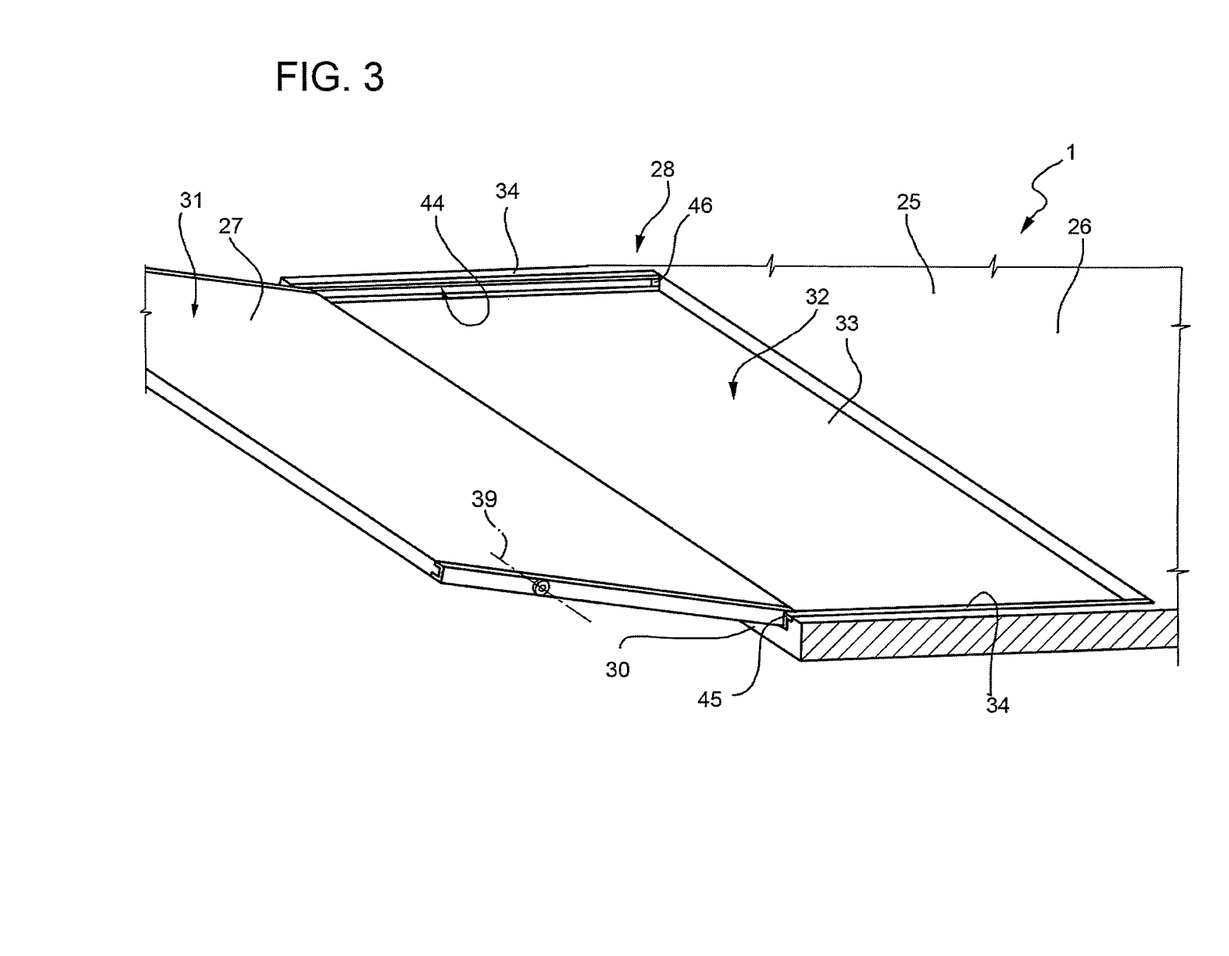

It is therefore apparent that, by making slides 37 coming out of channels 36, panel 27 may be longitudinally pulled out to a greater extent, since it may reach out a second front end position, slides 38 being arranged in abutment against surfaces 45 (FIGS. 3 and 4). In addition, panel 27 may be tilted relative to panel 25, and therefore can be rested on a rear portion of surface 11 of backrest 9 when backrest 9 is folded (FIG. 4). In this configuration, panel 27 not only covers the gap between seat 6 and panel 25, but defines a union that joins surface 11 to panel 25, and therefore allows to have a substantially continuous loading surface when backrest 9 is folded. Panel 27 is stable, since it is supported from below by seat 6. In addition, panel 27 has a great freedom of movement, whereby its position may be manually adjusted in a simple manner for covering the above gap, irrespective of the position owned by seat 6 in the longitudinal direction.

Specifically, in the configuration shown in FIG. 4, panel 25 is at a higher level than the configuration shown in FIG. 1. In order to manually raise and lower loading shelf 1 between the various levels, there may be provided handling and/or adjusting systems, or the loading shelf may be completely removed and re-positioned either on supporting members 23 or on floor 22 without the help of such systems. In both cases, in order to grasp loading shelf 1, panel 27 preferably has a rearly arranged handle (partially shown in FIGS. 3 and 4).

From the above, it is apparent that loading shelf 1 allows to split luggage compartment 4 height-wise, cover the gap behind seats 6 irrespective of the longitudinal adjustment of seats 6, and form a loading surface which is substantially continuous with backrests 9 and panel 25, when backsrests 9 have are folded.

In addition, loading shelf 1 is extremely versatile, stable, easy-to-use, and cost-effective to be implemented.

Finally, it appears clear that modifications and variations may be made to loading shelf 1 here described and illustrated, without however departing from the scope of the present invention, as defined in the accompanying claims.

Specifically, loading shelf 1 may have a single panel 27 if back seat 3 is not split; and/or vehicle 5 may have two adjoining loading shelfs 1 with respective reciprocally separated panels 25, one for each of seats 6.

There may be provided retaining members or elastic members which hold panel 27 against backrest 9 and/or which make panel 27 rotating downwardly, for preventing vibrations of panel 27 in the configuration shown in FIG. 4.

In order to make slides 37 coming out of rails 34 only in response to an additional and voluntary action by a user, the elastic members may act by rotating panel 27 downwardly, or deformable retaining portions may be associated with the edges of openings 48 for making slides 37 snap during the passage through openings 48, or movable or removable closing members may be provided on openings 48.

In addition, retaining members, such as magnets, may be provided in order to hold panels 27 in at least one of the above-described end positions.

Panels 27 may be provided with handles at their front end for facilitating their rotation upward and/or their forward translation towards seat 6.

In addition, channels 36 may be made directly into panel 25, without additional members; and/or slides 37,38 may be defined by fixed pins; and/or the number of slides 37 may be different; and/or openings 48 may be made in different positions, for example into surfaces 45 or in proximity of surfaces 45.

Loading shelf 1 may have a shape and size so as to act, in addition and if required, as a rear shelf for covering the loads of luggage compartment 4.

Finally, loading shelf 1 could be arranged at a fixed intermediate level into luggage compartment 4, therefore without being movable height-wise.

The invention claimed is:
1. A vehicle comprising:
a luggage compartment;
a longitudinally adjustable rear seat; and
a loading shelf positioned in the luggage compartment, the loading shelf having a variable length configured to cover a gap behind the rear seat irrespective of the longitudinal adjustment of the rear seat, the loading shelf comprising:
- a substantially flat rear panel;
- at least one substantially flat front panel;
- guide-and-slide means for guiding said front panel along a longitudinal direction relative to said rear panel between a rear stop position and a first front end position;

said guide-and-slide means comprising:
- a) two longitudinal channels fixed relative to said rear panel, and
- b) slide means carried by said front panel and slidingly engaging said channels;

said slide means comprising at least one front slide and two rear slides; the rear slides being coaxial along a first axis orthogonal to said longitudinal direction;

wherein, during sliding between the rear stop position and the first front end position, said front slide engages one of said channels, which has at least an opening having position, shape and size so as to let said front slide come out of said channel; and wherein said front panel may be rotated upwards about said first axis and may be pulled and reach out a second front end position relative to said rear panel, when said front slide is outside of the one of said channels.

2. The vehicle according to claim 1, wherein said slide means comprise two front slides coaxial along a second axis parallel to said first axis and engaging said channels, respectively; each of said channels having a respective opening for making the corresponding front slide come out.

3. The vehicle according to claim 1, wherein said opening is made through a longitudinal wall which defines the upper side of the respective channel.

4. The vehicle according to claim 3, wherein said opening is longitudinally away from a rear end surface of the respective channel by an amount greater than a wheel base between said front slide and said rear slides.

5. The vehicle according to claim 3, wherein said channels are closed at their front and rear ends by means of stop surfaces.

6. The vehicle according to claim 1, wherein said guide-and-slide means comprises positioning means for positioning said front slide in at least one given position.

7. The vehicle according to claim 6, wherein said positioning means comprises at least one retaining recess, which is provided on a longitudinal wall defining the lower side of said channel and is adapted to be engaged in a releasable manner by said front slide.

8. The vehicle according to claim 1, wherein said slides are arranged along the longitudinal side edges of said front panel.

9. The vehicle according to claim 8, wherein said rear panel has a seat at least partially housing said front panel, and the lower side of said seat is defined by a wall parallel to said longitudinal direction.

10. The vehicle according to claim 1, wherein said front and rear panels have respective upper surfaces which are reciprocally flush when said front slide engages the respective channel.

11. The vehicle according to claim 1, wherein said front slide is defined by a roller.

12. The vehicle according to claim 1, wherein said channels are defined by respective rails fastened to said rear panel.

13. The vehicle according to claim 1, wherein said front panel is capable of sliding forward from the rear stop position to the first end position when said front slide engages the respective channel, and being pulled to a greater extent and reaching the second end position relative to said rear panel, when said front slide is outside of the respective channel.

* * * * *